United States Patent [19]

Tokumitsu et al.

[11] Patent Number: 5,022,836

[45] Date of Patent: Jun. 11, 1991

[54] SEALING DEVICE FOR OIL ROTARY VACUUM PUMP

[75] Inventors: Kiyonori Tokumitsu; Akira Baba; Sadanori Hirano, all of Fukuoka, Japan

[73] Assignee: Mitsubishi Denki Kabushiki Kaisha, Tokyo, Japan

[21] Appl. No.: 476,226

[22] Filed: Feb. 7, 1990

[30] Foreign Application Priority Data

Aug. 10, 1989 [JP] Japan ................................ 1-205802

[51] Int. Cl.⁵ ...................... F04C 27/02; F04C 29/02
[52] U.S. Cl. .................................... 418/76; 418/96; 418/97; 418/104
[58] Field of Search ............... 418/75, 79, 96, 104, 418/76, 97–100

[56] References Cited

FOREIGN PATENT DOCUMENTS

| 3335892 | 8/1984 | Fed. Rep. of Germany | 418/96 |
| 1327273 | 4/1963 | France | 418/96 |
| 1-74392 | 5/1989 | Japan |  |

*Primary Examiner*—John J. Vrablik
*Attorney, Agent, or Firm*—Sughrue, Mion, Zinn, Macpeak and Seas

[57] ABSTRACT

A sealing device for an oil rotary vacuum pump of the type which includes a rotor, a cylinder for accommodating the rotor, the cylinder having a suction port and a discharge port, an end cover provided at one end of the cylinder, a rotary shaft of the rotor passing the end cover, an oil casing attached to the end cover such that it encloses the cylinder, the oil casing containing oil, an interior of the oil casing above the oil forming a space portion, and a bearing provided in the end cover so as to rotatably support the rotary shaft of the rotor. The sealing device includes: a pair of sealing members mounted on a rotary shaft of the rotor and provided in the end cover, the sealing members being disposed separately from each other so as to form a gap portion therebetween, the pair of sealing members being located on the side of the bearing which is remote from the rotor; an oil reservoir portion formed between the bearing and the sealing member closer to the rotor in the pair of sealing members; a first passage for connecting the oil reservoir portion with the interior of the cylinder which is in the vicinity of the discharge port thereof; a lubricant disposed in the gap portion between the pair of sealing members; and a second passage for connecting the gap portion between the pair of sealing members and the space portion in the oil casing.

4 Claims, 6 Drawing Sheets

SEALING DEVICE FOR OIL ROTARY VACUUM PUMP

BACKGROUND OF THE INVENTION

1. Field of the Invention

The present invention relates to an improvement of a sealing device for an oil rotary vacuum pump.

2. Description of the Related Art

Conventional sealing devices of the above-described type have been proposed in, for example, the specification of Japanese Utility Model Laid-Open No. 85507/1979. FIG. 5 shows such a sealing device. In this sealing device, a cylinder 4 is fixed to an end cover 5 of an oil casing 1. A rotor 2 is disposed in this cylinder 4. The rotor 2 is mounted on a rotary shaft 6 of a motor 20 which passes through the end cover 5. The rotor 2 has a plurality of grooves 2a which extend in its radial direction and in each of which a vane 3 is slidably retained. The rotary shaft 6 of the motor 20 is supported by a pair of bearings 7 provided in the end cover 5. Between these bearings 7 are disposed a pair of oil seals 8 which are the sealing members for the rotary shaft 6. The oil seals 8 are separated from each other so as to form an oil reservoir portion 9 therebetween. An oil introducing passage 10 for communicating the oil reservoir portion 9 with a lower portion of the interior of the oil casing 1 is formed in the end cover 5.

During the operation of the vacuum pump in which the motor 20 is driven in a state where oil 21 is contained in the oil casing 1, the oil 21 in the oil casing 1 is introduced into the oil reservoir portion 9 through the oil introducing passage 10 so as to lubricate the oil seals 8. Leakage of the oil 21 is prevented by the oil seal 8 disposed closer to the motor 20.

In the above-described sealing device for an oil rotary vacuum pump, since the oil 21 is always contained in the oil reservoir portion 9, excellent lubrication is provided. However, leakage of a very small amount of oil from the clearance between the oil seal 8 disposed closer to the motor 20 and the rotary shaft 6 is unavoidable. In particular, a large amount of oil leaks when the temperature rise is great or when abnormal vibrations of the rotary shaft 6 occur.

Accordingly, Japanese Utility Model Laid-Open No. 74392/1989 filed by the present applicant discloses a sealing device such as that shown in FIG. 6. In this sealing device, an oil reservoir portion 9 is formed between the oil seal 8 disposed closer to the rotor 2 and the bearing 7, and this oil reservoir portion 9 is connected to the interior of the cylinder 4 which is in the vicinity of a discharge port through an oil introducing passage 11. In consequence, when a space closed by the vane 3 in the vicinity of the discharge port of the cylinder 4 is compressed as a consequence of the rotation of the rotor 2, the oil contained in this space flows into the oil reservoir portion 9 through the oil introducing passage 11. At that time, the pressure in the oil reservoir portion 9 which communicates with the interior of the cylinder 4 which is in the vicinity of the discharge port is slightly lower than the atmospheric pressure, and is slightly higher than the negative pressure in the vicinity of the axis of the rotor 2. In consequence, the oil flowed into the oil reservoir portion 9 from the interior of the cylinder 4 which is in the vicinity of the discharge port through the oil introducing passage 11 returns to the cylinder 4 through a clearance between the rotary shaft 6 and the bearing 7, thereby preventing leakage of the oil through the oil seal 8.

With this sealing device, leakage of oil can be prevented while excellent lubrication of the bearing 7 and the oil seals 8 can be maintained so long as the vacuum pump is operated under normal conditions.

However, in a case where a large amount of exhaust gas is continuously discharged for a long period of time, where the exhaust cycle of the rotary vacuum pump is extremely short, such as a few seconds, where the oil seals 8 are worn out or deteriorated, or where the oil seals 8 are not fitted on the rotary shaft 6 very closely due to errors in the surface precision or in the assembly, oil may enter a gap portion 17 between the pair of oil seals 8 from the oil reservoir portion 9, raising the pressure in the gap portion 17 and thereby generating oil leakage.

SUMMARY OF THE INVENTION

The present invention is directed to eliminating the aforementioned problem of the related art, and an object thereof is to provide a sealing device for an oil rotary vacuum pump which is capable of preventing oil leakage while maintaining lubrication for a bearing and for a sealing member.

To this end, the present invention provides a sealing device for an oil rotary vacuum pump, which includes a pair of sealing members mounted on a rotary shaft of a rotor and provided in an end cover, the sealing members being disposed separately from each other so as to form a gap portion therebetween, the pair of sealing members being located on the side of a bearing which is remote from a rotor, an oil reservoir portion formed between the bearing and the sealing member closer to the rotor in the pair of sealing members, a first passage for communicating the oil reservoir portion with the interior of a cylinder which is in the vicinity of a discharge port thereof, a lubricant disposed in the gap portion formed between the pair of sealing members, and a second passage for communicating the gap portion between the pair of sealing members and a space portion in an oil casing.

DESCRIPTION OF THE PREFERRED EMBODIMENTS

Embodiments of the present invention will be described below with reference to the accompanying drawings.

Figure 1:
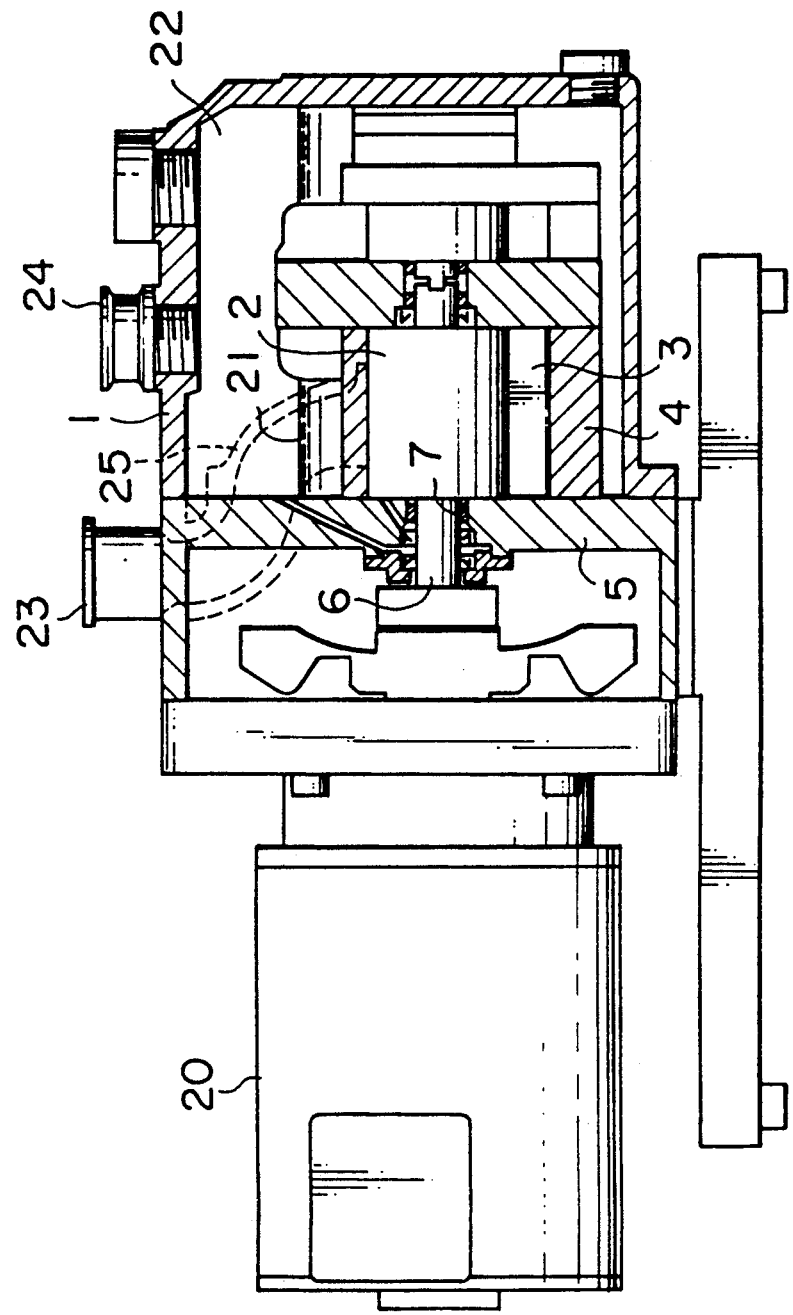
FIG. 1 is a schematic view, partly in cross section, of an oil rotary vacuum pump with a sealing device according to one embodiment of the present invention.

Referring first to FIG. 1, an end cover 5 is attached to an end portion of an oil casing 1 so as to close the oil casing 1. A cylinder 4 is accommodated in the oil casing 1 in a state where an end of the cylinder 4 is fixed to the end cover 5. The oil casing 1 contains oil 21 to a level at which the cylinder 4 is immersed in the oil 21. Space formed within the oil casing 1 above the oil 21 forms a space portion 22. Within the cylinder 4 is disposed a rotor 2 which is mounted on a rotary shaft 6 of a motor 20 which passes through the end cover 5. The rotor 2 has a plurality of grooves (not shown) which extend in its radial direction and in each of which a vane 3 is slidably retained. The rotary shaft 6 of the motor 20 is rotatably supported by a bearing 7 provided within the end cover 5. A suction port 23 is provided at the upper portion of the end cover 5, and an exhaust port 24 is provided at the upper portion of the oil casing 1. The suction port 23 is connected to a suction port (not shown) of the cylinder 4 through a suction pipe 25.

Figure 2:
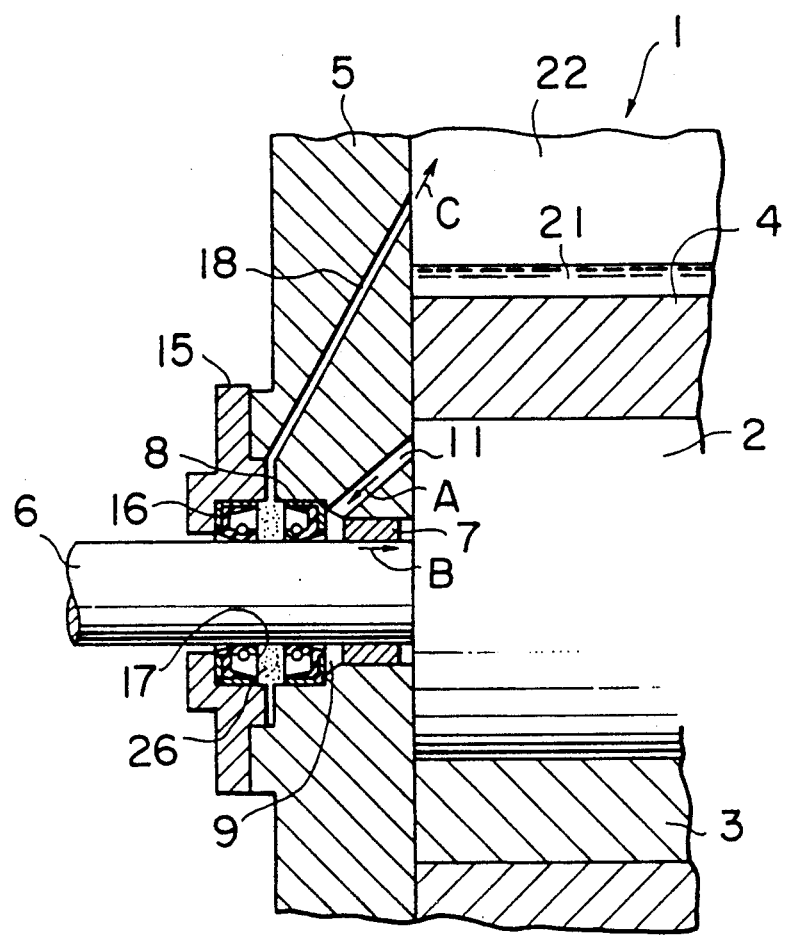
FIGS. 2 and 3 are respectively enlarged and end views of the essential parts of the sealing device of FIG. 1.

FIG. 2 shows a sealing device according to this embodiment which is provided in the end cover 5. In this sealing device, a first oil seal 8 is formed in the end cover 5 in such a manner that it surrounds the outer periphery of the rotary shaft 6. The first oil seal 8 is located on the side of the bearing 7 which is remote from the rotor 2, i.e., the side closer to the motor 20, and an oil reservoir portion 9 is formed between this oil seal 8 and the bearing 7. A housing cover 15 is fixed to an end surface of the end cover 5 which is remote from the rotor 2. Within this housing cover 15, a second oil seal 16 is fitted on the outer periphery of the rotary shaft 6. The first and second oil seals 8 and 16 in combination form a pair of oil sealing members. The first and second oil seals 8 and 16 are disposed separately from each other so as to form a gap portion 17 therebetween. The gap portion 17 is filled with a lubricant 26, such as grease. An oil introducing passage 11 is formed in the end cover 5 so as to connect the oil reservoir portion 9 to the interior of the cylinder 4 which is in the vicinity of the discharge port (not shown) thereof. Also, a pressure releasing passage 18 is formed in the end cover 5 so as to connect the gap portion 17 formed between the oil seals 8 and 16 and the space portion 22 formed in the oil casing 1. The oil introducing passage 11 and the pressure releasing passage 18 respectively constitute first and second passages.

Figure 3:
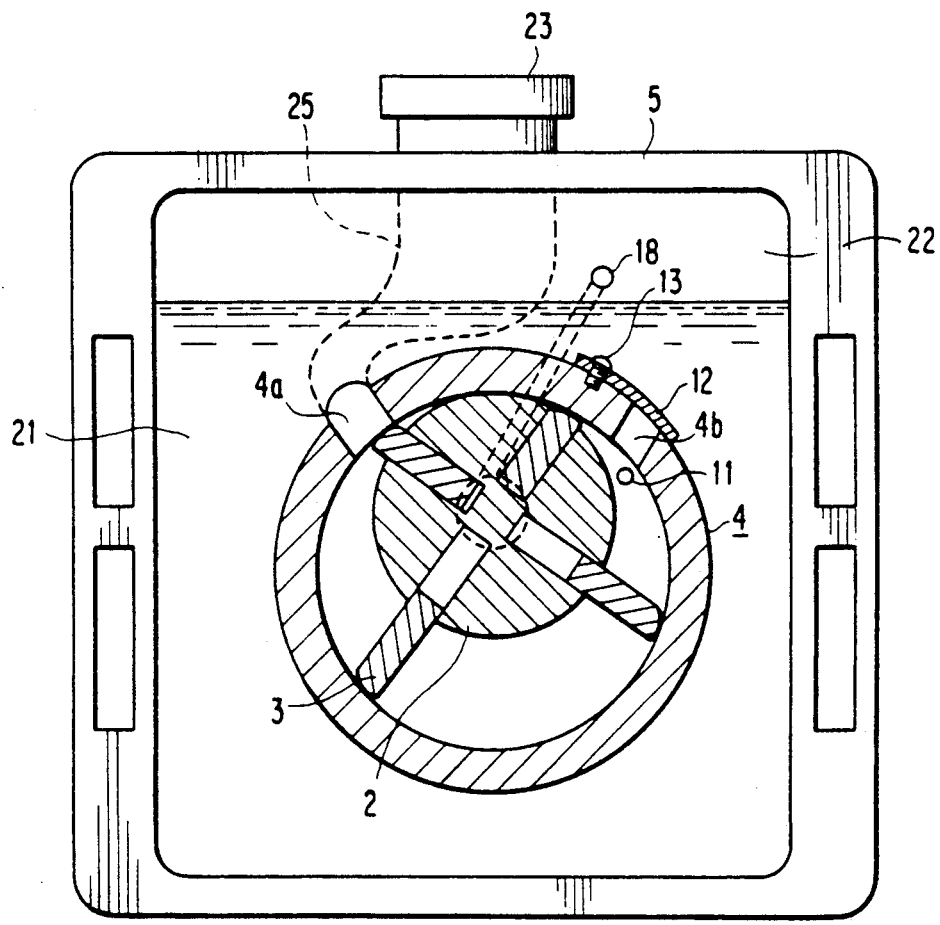

FIG. 3 is an end view of the end cover 5 as viewed from the direction of the interior of the oil cover 1. The suction port 23 is connected to a suction port 4a of the cylinder 4 through the suction pipe 25. To a discharge portion 4b of the cylinder 4 is fixed by a screw 13 a check valve 12 for permitting the oil to flow in one direction only. The oil introducing passage 11 opens into the interior of the cylinder 4 which is in the vicinity of the discharge port 4b thereof. The pressure releasing passage 18 opens into the space portion 22 formed above the oil 21 accommodated in the oil casing 1.

Next, the operation of this embodiment will be described below.

As the rotor 2 is rotated within the cylinder 4 by the motor 20, a space closed by the vanes 3 in the vicinity of the discharge port 4b of the cylinder 4 is compressed, causing the oil 21 located in this space to flow out of the cylinder 4, pass through the oil introducing passage 11 then flow into the oil reservoir portion 9, as indicated by the arrow A in FIG. 2. At that time, the pressure P2 in the oil reservoir portion 9 which communicates with the interior of the cylinder 4 which is in the vicinity of the discharge port 4b thereof is slightly lower than an atmospheric pressure P1, and is slightly higher than a negative pressure P3 in the vicinity of the axis of the rotor 2. In other words, $P1 > P2 > P3$. In consequence, the oil 21 flowed into the oil reservoir portion 9 from the interior of the cylinder which is in the vicinity of the discharge port 4b through the oil introducing passage 11 returns to the cylinder 4 through a clearance formed between the rotary shaft 6 and the bearing 7, as indicated by the arrow B in FIG. 2, thus allowing leakage of the oil through the end cover 5 to be prevented by the first oil seal 8. Furthermore, since the oil 21 is introduced into the oil reservoir portion 9 in the above-described manner, the bearing 7 and the first oil seal 8 can be maintained in an excellent lubricated state over a long period of time.

When a large amount of exhaust ga is continuously discharged for a long period of time, however, or when the exhaust cycle of the rotary vacuum pump operated is extremely short, such as a few seconds, the amount of oil introduced from the cylinder 4 into the oil reservoir portion 9 through the oil introducing passage 11 may exceed the amount of oil which flows back from the oil reservoir portion 9 into the cylinder 4 through the clearance between the shaft 6 and the bearing 7 (arrow B). In that case the pressure in the oil reservoir portion 9 increases, and part of the oil 21 in the oil reservoir portion 9 may pass through a clearance between the first oil seal 8 and the rotary shaft 6 and enter the gap portion 17. This entry of the oil 21 into the gap portion 17 may also occur when the first oil seal 8 is worn out or deteriorated, or when the oil seal 8 is not fitted on the rotary shaft 6 very closely.

However, as stated above, since the gap portion 17 is in communication with the space portion 22 of the oil casing 1 through the pressure releasing passage 18, when the pressure in the gap portion 17 increases due to the entry of the oil 21 into the gap portion 17, the oil 21 in the gap portion 17 passes through the oil releasing passage 18 and flows back into the oil casing 1 due to a difference in the pressure, as indicated by the arrow C in FIG. 2. Thus, the oil 21, which abnormally enters the gap portion 17 between the first and second oil seals 8 and 16 from the oil reservoir portion 9, is not externally leaked through the end cover 5.

In a case where the suction port 23 is provided at the upper portion of the end cover 5, as shown in FIG. 3, it may be difficult for the pressure releasing passage 18 which extends from the gap portion 17 to the space portion 22 in the oil casing 1 to be formed in a perpendicular plane due to the presence of the suction pipe 25 which connects the suction port 23 to the suction port 4a of the cylinder 4. In that case, the pressure releasing passage 18 may be formed in the end cover 5 in such a manner that it is inclined at a predetermined angle, e.g., 45 degrees, in the circumferential direction of the rotary shaft 6.

Figure 4:
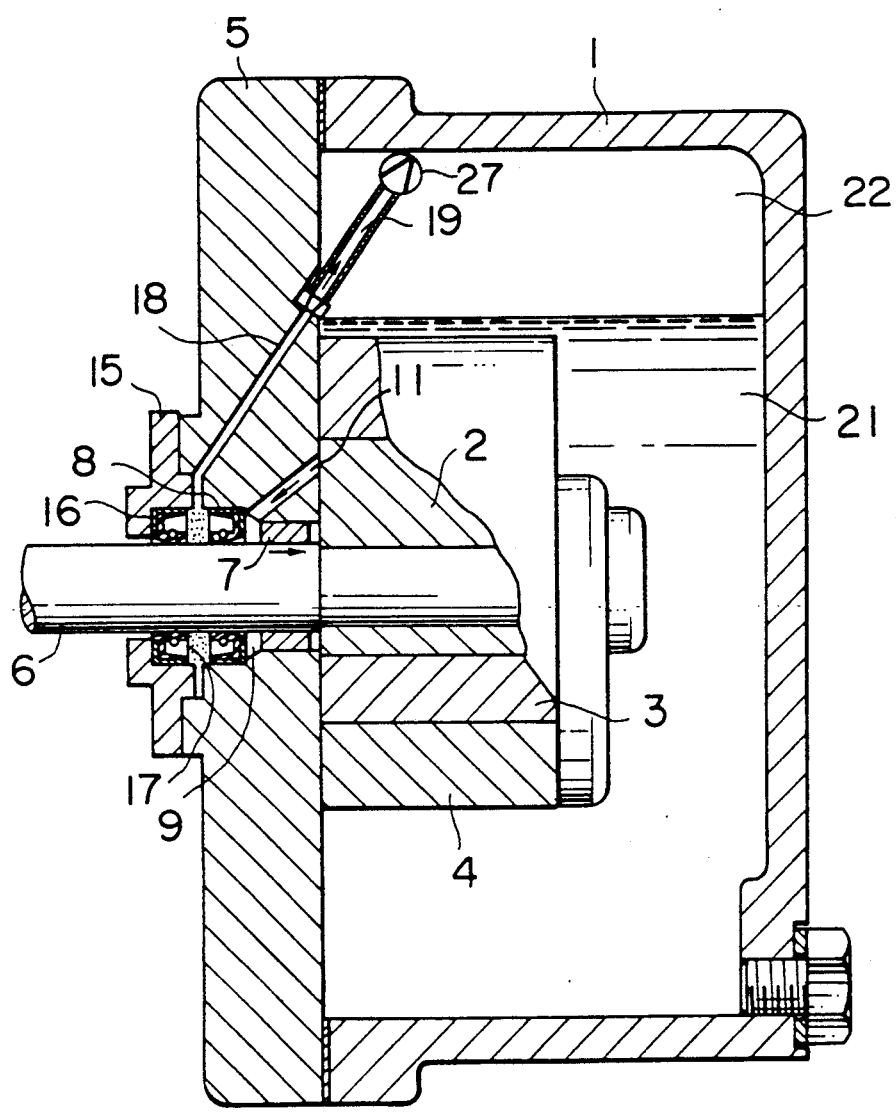
FIG. 4 is a cross-sectional view of the oil rotary vacuum pump, showing another embodiment of the present invention.
Figure 5:
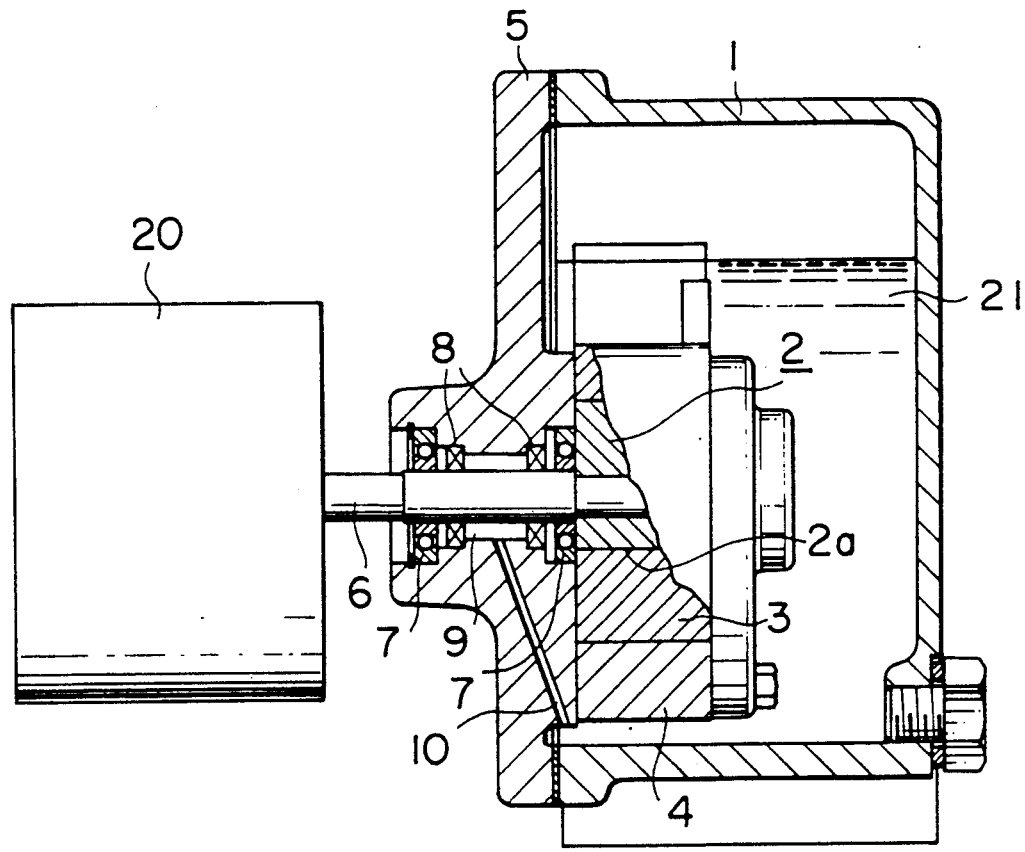
FIGS. 5 and 6 are respectively cross-sectional views of conventional sealing devices for an oil rotary vacuum pump.
Figure 6:
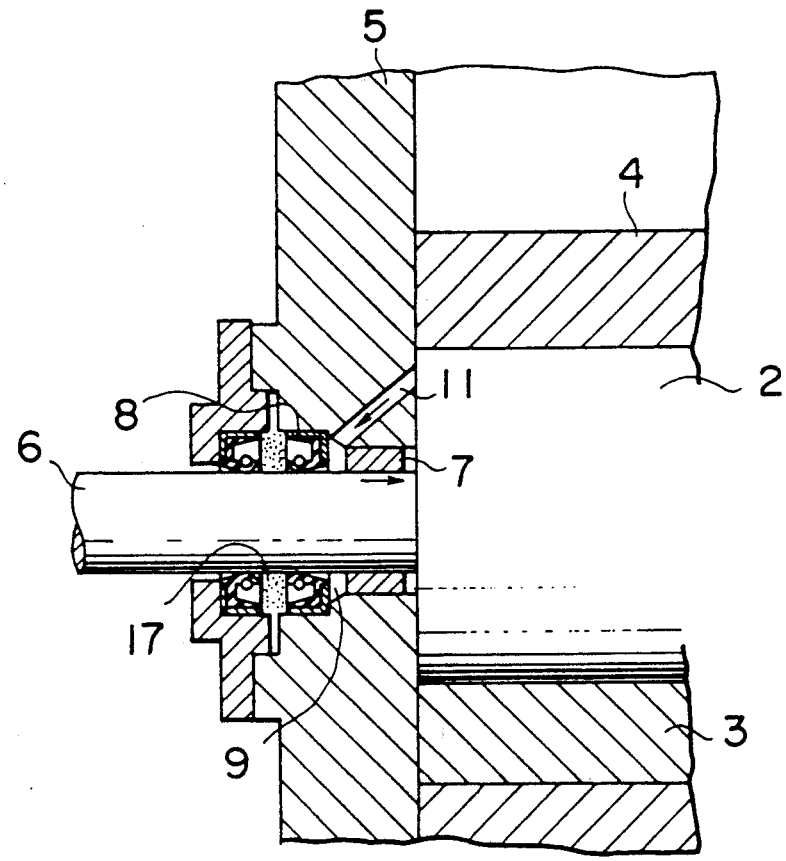

One end of a pressure releasing pipe 19 may be mounted on the opening portion of the pressure releasing passage 18, which opens into the space portion 22 in the oil casing 1, in such a manner that the pressure releasing passage 18 is connected to the pressure releasing pipe 19, as shown in FIG. 4. This provision of the pressure releasing pipe 19 ensures that the other end of the pressure releasing pipe 19 opens into the space portion 22 even when a large amount of oil 21 is contained in the oil casing 1 and the level thereof is higher. This is therefore particularly effective in a case where the pressure releasing passage 18 is formed in such a manner as to be inclined in the circumferential direction of the rotary shaft 6, as shown in FIG. 3.

In order to prevent the oil 21 in the oil casing 1 from flowing into the gap portion 17 through the pressure releasing passage 18, a check valve may be provided at the opening portion of the pressure releasing passage 18. Furthermore, as shown in FIG. 4, one end of the pressure releasing pipe 19 may be connected to the pressure releasing passage 18 while the other end of the pressure releasing pipe 19 is provided with a check valve 27.

What is claimed is:

1. A sealing device for an oil rotary vacuum pump of the type which includes a rotor, a cylinder for accommodating said rotor, said cylinder having a suction port and a discharge port, an end cover provided at one end of said cylinder, a rotary shaft of said rotor passing through said end cover, an oil casing attached to said end cover such that it encloses said cylinder, said oil casing containing oil, an interior of said oil casing above the upper surface of said oil forming a space portion, and a bearing provided in said end cover so as to rotatably support said rotary shaft of said rotor, the sealing device further comprising:
- a pair of sealing members mounted on said rotary shaft of said rotor and provided in said end cover, said sealing members being disposed separately from each other so as to form a gap portion therebetween, said pair of sealing members being located on the side of said bearing which is remote from said rotor;
- an oil reservoir portion formed between said bearing and the sealing member closer to said rotor in said pair of sealing members;
- a first passage for connecting said oil reservoir portion and the interior of said cylinder which is in the vicinity of said discharge port thereof;
- a lubricant disposed in said gap portion between said pair of sealing members; and
- a second passage for connecting said gap portion between said pair of sealing members and said space portion of said oil casing.

2. A sealing device according to claim 1, wherein said second passage is formed in said end cover.

3. A sealing device according to claim 1, further including an extension pipe connected to an end portion of said second passage which opens into said space portion of said oil casing.

4. A sealing device according to claim 1, further including a check valve provided at an end portion of said second passage which opens into said space portion of said oil casing.

* * * * *